United States Patent
Chien

(10) Patent No.: US 9,226,223 B2
(45) Date of Patent: Dec. 29, 2015

(54) NETWORK CONNECTION SYSTEM OF NETWORK ELECTRONIC DEVICE AND METHOD ALLOWING A TERMINAL DEVICE TO ACCESS AN ELECTRONIC DEVICE CONNECTED BEHIND A ROUTER WITHOUT A NAT LOOPBACK FUNCTION

(75) Inventor: Huang-Jen Chien, New Taipei (TW)

(73) Assignee: AV Tech Corporation, New Taipei (TW)

( * ) Notice: Subject to any disclaimer, the term of this patent is extended or adjusted under 35 U.S.C. 154(b) by 272 days.

(21) Appl. No.: 13/360,317

(22) Filed: Jan. 27, 2012

(65) Prior Publication Data
US 2013/0107697 A1    May 2, 2013

(30) Foreign Application Priority Data
Nov. 1, 2011 (TW) .............................. 100139731 A

(51) Int. Cl.
H04W 24/00 (2009.01)
H04L 12/26 (2006.01)
H04W 48/14 (2009.01)
H04W 24/04 (2009.01)

(52) U.S. Cl.
CPC .............. *H04W 48/14* (2013.01); *H04W 24/04* (2013.01)

(58) Field of Classification Search
USPC .............................. 709/222, 206; 370/395.53
See application file for complete search history.

(56) References Cited

U.S. PATENT DOCUMENTS

| 7,313,113 B1 * | 12/2007 | Hills et al. ..................... 370/332 |
| 2010/0165993 A1 * | 7/2010 | Basilier ..................... 370/395.53 |
| 2011/0219103 A1 * | 9/2011 | Treadwell et al. ............. 709/222 |
| 2012/0110100 A1 * | 5/2012 | Hiramatsu ..................... 709/206 |

FOREIGN PATENT DOCUMENTS

CN         101414961 A    *    4/2009

* cited by examiner

*Primary Examiner* — Kevin C Harper
*Assistant Examiner* — Derrick V Rose
(74) *Attorney, Agent, or Firm* — Wang Law Firm, Inc.; Li K. Wang; Stephen Hsu

(57) ABSTRACT

A method allowing a terminal device to access an electronic device connected behind a router without a NAT loopback function that includes following steps: sending a connection request having identification information to a network bridge device by a terminal device to connect to the network electronic device; sending a broadcast signal by the terminal device to search the network electronic device if the terminal device is unable to connect to the network electronic device according to the identification information; sending a response signal to the terminal device after the network electronic device receiving the broadcast signal; allowing the terminal device to connect to the network electronic device according to the response signal.

8 Claims, 3 Drawing Sheets

NETWORK CONNECTION SYSTEM OF NETWORK ELECTRONIC DEVICE AND METHOD ALLOWING A TERMINAL DEVICE TO ACCESS AN ELECTRONIC DEVICE CONNECTED BEHIND A ROUTER WITHOUT A NAT LOOPBACK FUNCTION

CROSS-REFERENCE TO RELATED APPLICATION

This application claims the benefit of priority to Taiwan Patent Application No. 100139731, filed on Nov. 1, 2011, in the Taiwan Intellectual Property Office, the disclosure of which is incorporated herein in its entirety by reference.

BACKGROUND OF THE INVENTION

1. Field of the Invention

The present invention relates to a method for connecting to a network electronic device, in particular to a network connection system of network electronic device and connection its method capable of establishing connection again without inputting network setting parameters again through a user when a connection of a network electronic device connected behind a router without a NAT loopback function is unable to be established.

2. Description of the Related Art

In accordance with the development of wireless network, a web camera is gradually and widely applied to offices, pre-elementary schools or daily life to start image taking operations such real-time video conferences, home safety surveillances that provide parents to observe activity condition of children. To achieve providing a user at a third spot to take pictures real-time through a wireless web camera, the wireless web camera is connected to internet or local area network through an access point such as a router. In system architecture, the wireless web camera is coupled to the access point through Ethernet, and the access point then is coupled to a personal computer. Therefore, the user must firstly use personal computers to obtain the connection corresponding to the access point when initially installing the wireless web camera or the installed web camera is discontinued. Next, the user uses personal computer entering the setting web page of the access point to obtain related network parameters of the access point such as data encryptions of service set identifiers (SSID), wired equivalent privacy (WEP) or Wi-Fi protected access (WPA), parameters of sub-net mask, domain name server (NDS) or gateway. When the personal computer is connected to the web camera, the user can fill the network parameters of the access point in the setting web page of the wireless web camera in accordance with the abovementioned description.

In brief, the user must use an external computer to set the parameter of the web camera such as the setting demand of the network configuration first or perform the transfer function of the connection port of the access point to transfer private IP address of the web camera to public IP address after the web camera is completely installed and the connection is unable to be established, thereby connecting to the internet. However, the setting demand of network configuration may be influenced by the problem of obtaining parameters of the private IP address or the public IP address to greatly increase the difficulty of repairing the connection of the web camera. Consequently, the desire of using the web camera may be further reduced.

SUMMARY OF THE INVENTION

In view of the shortcomings of the prior art, the inventor(s) of the present invention based on years of experience in the related industry to conduct extensive researches and experiments, and finally developed a network connection system of a network electronic device and its connection method as a principle objective to overcome a problem of setting connection parameters again through a computer support without automatically determining network addresses to automatically request connection again when a conventionally external device is unable to correctly connect network electronic devices such as web cameras.

To achieve the foregoing objective of the invention, a connection method for a network electronic device comprises the following steps: sending a connection request having identification information to a network bridge device by a terminal device to connect to a network electronic device; sending a broadcast signal by the terminal device to search the network electronic device if the terminal device is unable to connect to the network electronic device according to the identification information; sending a response signal to the terminal device after the network electronic device receives the broadcast signal; and allowing the terminal device to use the electronic device's response information that include a virtual network address and network port number to connect to the network electronic device.

In an embodiment, the identification information includes a host name and a physical network address of the network bridge device.

In an embodiment, the broadcast signal includes a media access control address of the network electronic device and the network address of the terminal device.

In an embodiment, the media access control address of the network electronic device is pre-stored in the terminal device.

In an embodiment, the response signal includes a virtual network address of the network electronic device.

In an embodiment, the connection method for network electronic device according to the invention further comprises the following steps: utilizing a universal plug and play (UPNP) protocol to automatically perform connection setting so as to establish communication channels when the terminal device and the network electronic device are connected to the network bridge device.

To achieve the foregoing objective of the invention, a network connection system of a network electronic device is further provided. The network connection system of a network electronic device includes a network bridge device, a network electronic device and a terminal device. The network bridge device includes identification information which has a physical network address. The network electronic device is connected behind the network bridge device, and the network electronic device has a virtual network address and a media access control address corresponding to a web domain of the network bridge device. The terminal device is connected to the network bridge device to send a connection request to connect to the network electronic device after receiving the identification information. Wherein, the terminal device sends a broadcast signal which has the media access control address of the network electronic device to search the network electronic device when the terminal device is unable to connect to the network electronic device according to the identification information. A response signal having the virtual network address to the terminal device is sent to allow the terminal device to connect to the network electronic device according to the response signal when the network electronic device receives the broadcast signal.

The network connection system of the network electronic device and its connection method can allow the user to automatically send the broadcast signal to search the network electronic device again when the connection is unable to be established. After obtaining another network address, the connection motion is performed again such that the user does not need to input setting parameter again so as to achieve the effect of simply connecting the network electronic device.

DETAILED DESCRIPTION OF THE PREFERRED EMBODIMENTS

The technical characteristics of a network connection system of a network electronic device and its connection method of the present invention may become apparent with the detailed description of the preferred embodiments and the illustration of the related drawings. It is noteworthy to point out that same numerals are used in the following preferred embodiments to represent respective elements.

Figure 1:
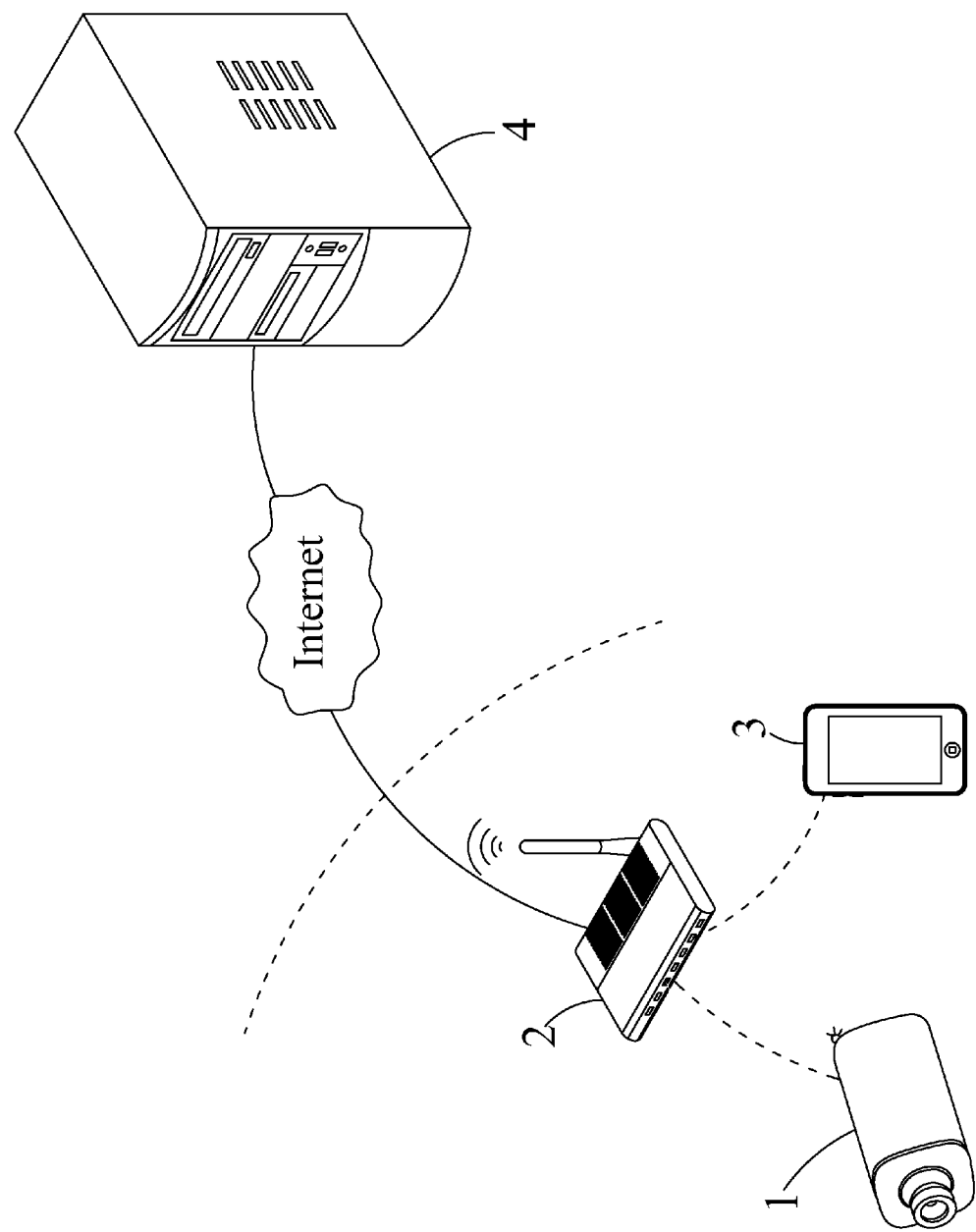
FIG. 1 is a schematic diagram of network connection system of a network electronic device according to the embodiment of the invention.

With reference to FIG. 1, a schematic diagram of a network connection system of a network electronic device according to an embodiment of the invention is depicted. As shown in FIG. 1, the network connection system of a network electronic device comprises a web camera 1, a network bridge device 2, a hand-held electronic device 3 and an external host 4. The web camera 1 and the hand-held electronic device 3 can be connected to the network bridge device 2, and then connect to the internet through the network bridge device 2, wherein the connection setting is automatically set by utilizing an universal plug and play (UPNP) protocol when the hand-held electronic device 3 and the network electronic device 1 are connected to the network bridge device 2. In the embodiment, the web camera 1 is selected to be a network electronic device according to the invention. The network electronic device can also be communication devices such as a mobile phone or a laptop computer equipped with a transmission device to communicate with each other through TCP/IP (transmission control protocol/internet protocol) or other communication protocols. The network bridge device 2 can be a router. The hand-held electronic device 3 can be mobile apparatuses such as a smart phone or a tablet computer (e.g. iPhone or iPad) such that a user can conveniently perform behaviors such as real-time video interview or security surveillance through the mobile device or the hand-held electronic products connected to the web camera 1. The hand-held electronic device 3 can, but not limited to, also be a host computer in the embodiment without restriction. The external host 4 can also be electronic devices such as a personal computer, a laptop computer or a tablet computer. The user can firstly install an application program of the web camera 1 in the hand-held electronic device 3 or the external host 4 to install or connect to the web camera 1 with the application program. The user can pre-store the media access control address of the web camera 1 as a hardware address in the hand-held electronic device 3.

In the abovementioned description, the application program installed in the hand-held electronic device 3 can be operated to send a connection request when the user would like to utilize the hand-held electronic device 3 to connect to the web camera 1. At the same time, the hand-held electronic device 3 can obtain the identification information having a host name and a physical network address for the network bridge device 2, so as to try to connect to the web camera 1 according to the identification information. If the connection is unable to be established, the hand-held electronic device 3 sends a broadcast signal to search the web camera 1. Since the hand-held electronic device 3 is pre-stored with the media access control address of the web camera 1, the broadcast signal transmitted from the hand-held electronic device 3 does not only include the network address of the hand-held electronic device 3 but also includes the media access control address of the web camera 1 to perform the searching motion in accordance with the media access control address. A response signal will be sent to the hand-held electronic device 3 after the web camera 1 receives the broadcast signal. The response signal includes a virtual network address translated from the physical network address by the network bridge device 2 performing address translation. Accordingly, the hand-held electronic device 3 is able to connect to the web camera 1 according to the virtual network address, wherein the hand-held electronic device 3 can be treated as a terminal device depicted in the invention.

In the abovementioned description, the user can operate the application program in the external host 4 to allow it to send a connection request when the user would like to connect to the web camera 1 by the external host 4. The external host 4 can obtain an identification signal having a host name and a physical network address for the network bridge device 2 to connect to the web camera 1 in accordance with the identification signal. Wherein, the external host 4 can be treated as a terminal device depicted in the invention.

Figure 2:
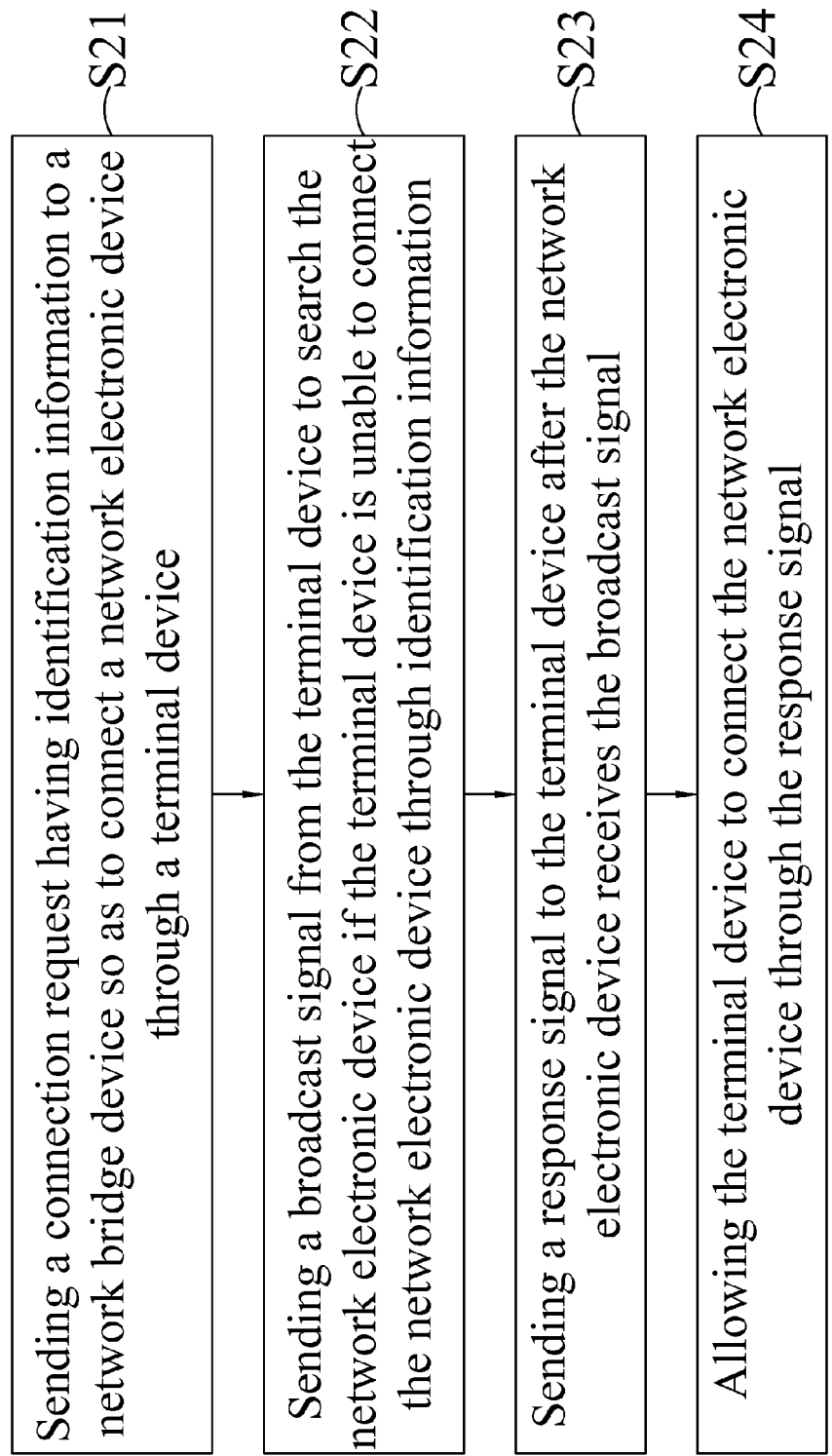
FIG. 2 is a first flowchart of the method allowing the terminal device to access the electronic device connected behind the router without the NAT loopback function according to the invention.

With reference to FIG. 2 for a first flowchart of the method allowing the terminal device to access the electronic device connected behind the router without the NAT loopback function according to the invention includes the following steps: S21: sending a connection request having identification information to a network bridge device so as to connect a network electronic device through a terminal device; S22: sending a broadcast signal from the terminal device to search the network electronic device if the terminal device is unable to connect to the network electronic device according to identification information; S23: sending a response signal to the terminal device after the network electronic device receives the broadcast signal; S24: allowing the terminal device to connect to the network electronic device according to the response signal.

Figure 3:
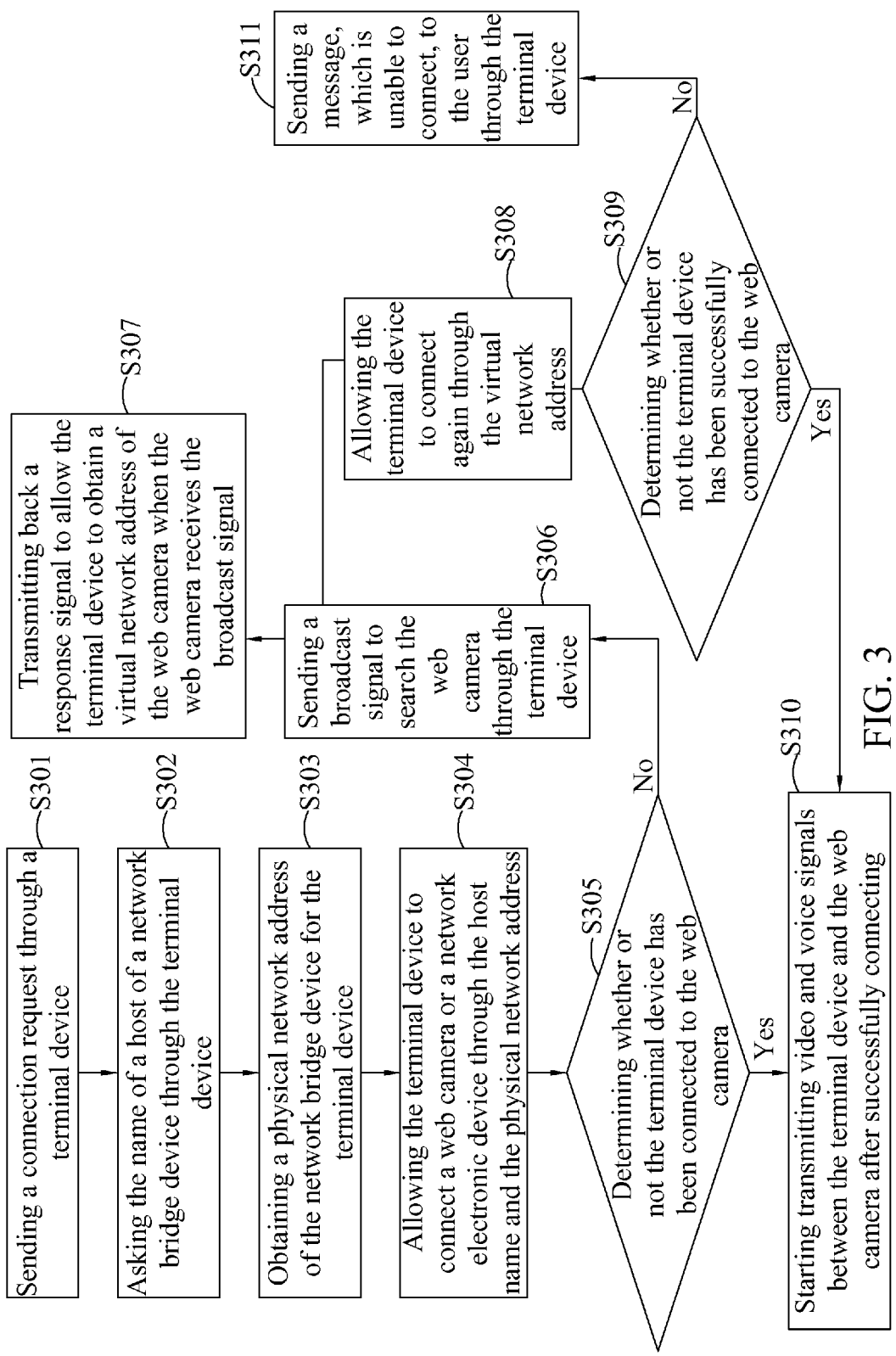
FIG. 3 is a second flowchart of the method allowing the terminal device to access the electronic device connected behind the router without the NAT loopback function according to the invention.

With reference to FIG. 3 for a second flowchart of the method allowing the terminal device to access the electronic device connected behind the router without the NAT loopback function according to the invention includes the following steps:

S301: sending a connection request by a terminal device.

S302: asking the name of a host of a network bridge device through the terminal device.

S303: obtaining a physical network address of the network bridge device for the terminal device.

S304: allowing the terminal device to connect to a web camera or a network electronic device according to the host name and the physical network address.

S305: determining whether or not the terminal device has been connected to the web camera. If not, go to step S306; if yes, go to step S310.

S306: sending a broadcast signal to search the web camera by the terminal device, wherein the broadcast signal includes a network address of the terminal device and a media access control address of the web camera, and the media access control address of the web camera can be pre-stored in the terminal device.

S307: transmitting back a response signal to allow the terminal device to obtain a virtual network address of the web camera when the web camera receives the broadcast signal.

S308: allowing the terminal device to connect again according to the virtual network address.

S309: determining whether or not the terminal device has been successfully connected to the web camera. If not, go to step S311; if yes, go to step S310.

S310: starting transmitting video and voice signals between the terminal device and the web camera after successfully connecting.

S311: sending a message, which is unable to connect, to the user by the terminal device.

With the installation of a camera and current communication protocol, the network connection system of the network electronic device and its connection method of the invention can allow the user to automatically connect to the web camera again according to another network address without setting the network configuration of the web camera twice when the connection of the web camera is unable to be established. Thus, complex secondary setting generated for the web camera due to the change of the private network address or public network address can be reduced to further improve the popular rate of the web camera.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A method allowing a terminal device to access an electronic device connected behind a router without a NAT (Network Address Translation) loopback function, comprising the steps of:
   sending a connection request to the router by the terminal device to receive identification information having a physical network address from the router and attempt to connect to the network electronic device accordingly;
   sending a broadcast signal by the terminal device to search the network electronic device if the terminal device is unable to connect to the network electronic device according to the identification information, wherein the broadcast signal includes a media access control address of the network electronic device, which is pre-stored in the terminal device;
   sending a response signal to the terminal device by the network electronic device having the media access control address identical to that included in the broadcast signal, wherein the response signal includes a virtual network address and a port number of the network electronic device; and
   allowing the terminal device to connect to the network electronic device according to the response signal;
   wherein the virtual network address of the network electronic device comprised in the response signal is translated from the physical network address of the router.

2. The method allowing the terminal device to access the electronic device connected behind the router without the NAT loopback function as recited in claim 1, wherein the identification information includes a host name and a physical network address of the router.

3. The method allowing the terminal device to access the electronic device connected behind the router without the NAT loopback function as recited in claim 1, wherein the broadcast signal further includes a network address of the terminal device.

4. The method allowing the terminal device to access the electronic device connected behind the router without the NAT loopback function as recited in claim 1, further comprising steps:
   utilizing a universal plug and play (UPNP) protocol to automatically perform connection setting so as to establish communication channels when the terminal device and the network electronic device are connected to the router.

5. A network connection system of a network electronic device comprising:
   a router, without a NAT (Network Address Translation) loopback function, comprising identification information having a physical network address;
   a network electronic device, connected behind the router, and the network electronic device having a virtual network address and a media access control address corresponding to a web domain of the router; and
   a terminal device, connected to the router, and the terminal device sending a connection request to receive the identification information having the physical network address from the router and attempt to connect to the network electronic device accordingly,
   wherein, the terminal device sends a broadcast signal having the media access control address of the network electronic device, which is pre-stored in the terminal device, to search the network electronic device when the terminal device is unable to connect to the network electronic device according to the identification information; response signal comprising the virtual network address and a port number of the network electronic device is sent to the terminal device by the network electronic device having the media access control address identical to that included in the broadcast signal to allow the terminal device to connect to the network electronic device according to the response signal; and
   wherein the virtual network address of the network electronic device comprised in the response signal is translated from the physical network address of the router.

6. The network connection system of a network electronic device as recited in claim 5, wherein the identification information further includes a host name.

7. The network connection system of a network electronic device as recited in claim 5, wherein the broadcast signal further comprises a network address of the terminal device.

8. The network connection system of a network electronic device as recited in claim 5, further comprising a universal plug and play (UPNP) protocol to automatically perform connection setting so as to establish communication channels when the terminal device and the network electronic device are connected to the router.

* * * * *